United States Patent
Sakita et al.

(10) Patent No.: US 7,004,157 B2
(45) Date of Patent: Feb. 28, 2006

(54) ROTARY CUTTING SAW WITH IMPROVED HEAT DISSIPATION PERFORMANCE

(75) Inventors: Kazuyuki Sakita, Kurume (JP); Yoji Niizawa, Kurume (JP)

(73) Assignees: Noritake Super Abrasive Co., Ltd., Kurume (JP); Noritake Co., Limited, Nagoya (JP)

( * ) Notice: Subject to any disclaimer, the term of this patent is extended or adjusted under 35 U.S.C. 154(b) by 0 days.

(21) Appl. No.: 11/071,302

(22) Filed: Mar. 4, 2005

(65) Prior Publication Data

US 2005/0224063 A1 Oct. 13, 2005

(30) Foreign Application Priority Data

Mar. 9, 2004 (JP) .............................. 2004-065328

(51) Int. Cl.
*B28D 1/04* (2006.01)

(52) U.S. Cl. .................... 125/15; 125/13.01; 451/488; 451/541; 451/546

(58) Field of Classification Search ................ 451/488, 451/449, 541, 546, 547; 125/13.01, 15
See application file for complete search history.

(56) References Cited

U.S. PATENT DOCUMENTS

| | | | | |
|---|---|---|---|---|
| 5,012,792 A | * | 5/1991 | Kawata et al. ................ 125/15 |
| 5,115,796 A | * | 5/1992 | Schweickhardt ......... 125/13.01 |
| 5,285,768 A | * | 2/1994 | Messina ....................... 125/15 |
| 5,560,348 A | * | 10/1996 | Markley et al. ............... 125/15 |
| 6,277,017 B1 | * | 8/2001 | Ji ............................... 451/547 |
| 6,632,131 B1 | * | 10/2003 | Buchholz ..................... 451/547 |
| 6,729,220 B1 | * | 5/2004 | Curtsinger et al. ........... 83/666 |
| 6,845,767 B1 | * | 1/2005 | Sakarcan ..................... 125/15 |
| 6,872,133 B1 | * | 3/2005 | Lee et al. .................... 451/546 |

FOREIGN PATENT DOCUMENTS

| JP | A-05-57619 | 3/1993 |
|---|---|---|
| JP | A-07-40252 | 2/1995 |
| JP | B2-3236550 | 9/2001 |

* cited by examiner

Primary Examiner—Eileen P. Morgan
(74) Attorney, Agent, or Firm—Oliff & Berridge, PLC

(57) ABSTRACT

A rotary cutting saw including: (a) a base disk which has a plurality of apertures formed therethrough and opening in axially opposite end surfaces thereof; (b) a plurality of abrasive segments which are fixed to an outer circumferential surface of the base disk; and (c) a plurality of axial-runout restraining members which are received in the apertures. Each of the axial-runout restraining members has a size which is smaller than a size of each of the apertures, such that a clearance is defined between the periphery of each of the apertures and a corresponding one of the axial-runout restraining members which is received in the each of the apertures. A ratio of a size of the clearance to the size of each of the axial-runout restraining members is 5–150%.

10 Claims, 3 Drawing Sheets

ROTARY CUTTING SAW WITH IMPROVED HEAT DISSIPATION PERFORMANCE

BACKGROUND OF THE INVENTION

1. Field of the Invention

The present invention relates in general to a rotary cutting saw, and more particularly to such a rotary cutting saw of so-called "dry-cutting type" which is used for cutting or parting a pavement surface.

2. Discussion of the Related Art

In a road construction or restoration, a pavement surface is cut or parted by using commonly a rotary cutting saw including a circle-shaped base disk and diamond cutting chips which are attached to an outer circumferential surface of the base disk. In a dry-cutting operation in compared with a wet-cutting operation, the cutting saw is less cooled so that the cutting chips are more likely to be burned due to generation of heat at their side surfaces, which are rubbed against a cut surface of the pavement since the cutting saw tends to suffer from an axial runout or a side-wall runout due to cutting resistance exerted to the cutting chips. Further, if each cutting chip is worn at its side surfaces to such an extent that causes side or axially opposite end surfaces of the base disk to be brought into contact with the cut surface, the base disk is heated whereby its blade tension is undesirably reduced.

In view of the above-described problems, there is proposed an arrangement which is provided on the axially opposite end surfaces of the base disk of the cutting saw and which serves to restrain wear of the base disk and contact of the base disk with a cut surface of a work material. Examples of such an arrangement are disclosed in JP-A-H07-40252 (publication of unexamined Japanese Patent Application laid open in 1995), JP-B2-3236550 (publication of Japanese Patent issued in 2001) and JP-A-H05-57619 (publication of unexamined Japanese Patent Application laid open in 1993).

In each of the disclosed examples, the rotary cutting saw includes, in addition to the diamond cutting chips as major cutting chips attached to the outer circumferential surface of the base disk, diamond cutting chips as auxiliary cutting chips are provided on the axially opposite end surfaces of the base disk, so as to cut side surfaces of a cut slot of the work material, for thereby avoiding the base disk from being rubbed against the work material and accordingly preventing the base disk from being worn. The provision of the auxiliary cutting chips also serve to reinforce the base disk. This arrangement makes it possible to prevent wear of the base disk, but is not effective to prevent burning in the major cutting chips, which is problematic particularly in a dry-cutting operation. Further, since the auxiliary cutting chips provided on the axially opposite end surfaces of the base disk cut the side surfaces of the cut slot, namely, the width of the cut slot is increased by the auxiliary cutting chips, the cutting saw becomes more movable within the cut slot in its axial direction, thereby making it impossible to restrain the axial runout of the cutting saw.

In a dry-cutting operation, the axial runout of the cutting saw leads to reduction in the cutting performance due to heat generation and wear of the cutting chips. Therefore, for assuring an excellent cutting performance of the cutting saw, an improvement in its heat dissipation performance and a reduction in the axial runout of the cutting saw are needed.

SUMMARY OF THE INVENTION

The present invention was made in view of the background prior art discussed above. It is therefore an object of the invention to provide a rotary cutting saw capable of maintaining its excellent cutting performance owing to improvement in its heat dissipation performance and reduction in its axial runout. This object may be achieved according to any one of first through tenth aspects of the invention which are described below.

The first aspect of the invention provides a rotary cutting saw including: (a) a base disk which has a plurality of apertures formed therethrough and opening in axially opposite end surfaces thereof; (b) a plurality of abrasive segments which are fixed to an outer circumferential surface of the base disk; and (c) a plurality of axial-runout restraining members which are received in the apertures. Each of the axial-runout restraining members has a size which is smaller than a size of each of the apertures, such that a clearance is defined between a periphery of each of the apertures and a corresponding one of the axial-runout restraining members which is received in the each of the apertures. A ratio of a size of the clearance to the size of each of the axial-runout restraining members is 5–150%.

According to the second aspect of the invention, in the rotary cutting saw defined in the first aspect of the invention, the above-described ratio is 50–100%.

According to the third aspect of the invention, in the rotary cutting saw defined in the first or second aspect of the invention, each of the axial-runout restraining members received in a corresponding one of the apertures has a predetermined amount of area as measured along a radial plane which is perpendicular to an axis of the base disk. The clearance defined between the periphery of each of the apertures and a corresponding one of the axial-runout restraining members has a predetermined amount of area as measured along the radial plane. The above-described ratio represents a ratio of the amount of area of the clearance to the amount of area of each of the axial-runout restraining members.

According to the fourth aspect of the invention, in the rotary cutting saw defined in any one of the first through third aspects of the invention, each of the abrasive segments is provided by a chip which has an abrasive structure including diamond abrasive grains. Each of the axial-runout restraining members is provided by a chip which has an abrasive structure including diamond abrasive grains.

According to the fifth aspect of the invention, in the rotary cutting saw defined in any one of the first through third aspects of the invention, each of the abrasive segments is provided by a chip which has an abrasive structure including diamond abrasive grains. Each of the axial-runout restraining members is provided by a chip which is formed of cemented carbide.

According to the sixth aspect of the invention, in the rotary cutting saw defined in any one of the first through fifth aspects of the invention, each of the abrasive segments is provided by an abrasive structure including abrasive grains. Each of the abrasive segments fixed to the outer circumferential surface of the base disk has a predetermined thickness as measured in an axial direction of the base disk. Each of the axial-runout restraining members received in a corresponding one of the apertures has a predetermined thickness as measured in the axial direction. The thickness of each of the axial-runout restraining members is smaller than the thickness of each of the abrasive segments by a predetermined amount that is smaller than an average size of the abrasive grains included in the abrasive structure providing each of the abrasive segments.

According to the seventh aspect of the invention, in the rotary cutting saw defined in any one of the first through sixth aspects of the invention, the base disk has radially outside and inside apertures as the plurality of apertures such that the radially inside apertures are located radially inwardly of the radially outside apertures. The radially outside apertures are equally spaced apart from each other as viewed in a circumferential direction of the base disk, while the radially inside apertures are equally spaced apart from each other as viewed in the circumferential direction. The axial-runout restraining members received in the radially outside apertures have respective radially outer ends which are equally distant from an outer periphery of the base disk. The axial-runout restraining members received in the radially inside apertures have respective radially outer ends which are equally distant from the outer periphery of the base disk.

According to the eighth aspect of the invention, in the rotary cutting saw defined in any one of the first through seventh aspects of the invention, each of the apertures has a width as measured in a circumferential direction of the base disk, which width is reduced as viewed in a direction away from an outer periphery of the base disk toward an axis of the base disk. Each of the axial-runout restraining members received in a corresponding one of the apertures has a width as measured in the circumferential direction, which width is reduced as viewed in the direction away from the outer periphery of the base disk toward the axis of the base disk.

According to the ninth aspect of the invention, in the rotary cutting saw defined in any one of the first through eighth aspects of the invention, each of the axial-runout restraining members received in a corresponding one of the apertures is fixed, at a front side surface thereof as viewed in a rotating direction of the rotary cutting saw, to an inner circumferential surface of the corresponding one of the apertures.

According to the tenth aspect of the invention, in the rotary cutting saw defined in the ninth aspect of the invention, the front side surface of each of the axial-runout restraining members is inclined by a predetermined angle, with respect to a straight line which passes through an axis of the base disk and a radially inner end of the front side surface of each of the axial-runout restraining members, such that the radially inner end of the front side surface is positioned on a forward side of a radially outer end of the front side surface as viewed in the rotating direction.

In the rotary cutting saw defined in any one of the first through tenth aspects of the invention, owing to the presence of the clearance whose size corresponds to 5–150% of the size of the axial-runout restraining member, it is possible to obtain an improved heat dissipation performance and prevent burning in the abrasive segments even in a dry-cutting operation, ie., a cutting operation without application of a cutting fluid to the cutting saw. Further, owing to the provision of the axially-runout restraining members, it is possible to restrain the axial runout of the cutting saw, i.e., an axial motion of each abrasive segment fixed to the outer circumferential surface of the base disk, since the axially-runout restraining members are brought into contact with a work material when the cutting saw suffers from its axial runout within a slot which is being currently cut or formed by the cutting saw. It is noted that the rotary cutting saw according to the present invention may be referred also to a cutting blade, a rotary blade, a cutting grindstone or a grinding wheel.

In the rotary cutting saw of the present invention, the ratio of the size of the clearance with respect to the size of the axial-runout restraining member is not lower than 5% and is not higher than 150%, so that the cutting saw is given a sufficiently high degree of heat dissipating capacity and a sufficiently high degree of blade tension. If the ratio is lower than 5%, the rotary cutting saw cannot be given the sufficiently high degree of heat dissipating capacity. If the ratio is higher than 150%, on the other hand, the rotary cutting saw cannot be given the sufficiently high degree of blade tension. It is noted that the ratio is preferably 50–100%, so that the rotary cutting saw is given a higher degree of heat dissipating capacity and a higher degree of blade tension. It is noted that the term "blade tension" used in the present specification should be interpreted to mean a tension which tends to stretch the base disk in its radially outward direction and which is given, for example, by hammering a peripheral portion of the base disk in a process of manufacturing the cutting saw. The base disk is thus pretensioned to have an increased rigidity, which prevents deformation of the base disk during a cutting operation as a practical use of the cutting saw.

In the rotary cutting saw defined in the sixth aspect of the invention, the thickness of each of the axial-runout restraining members is smaller than the thickness of each of the abrasive segments by the predetermined amount that is smaller than the average size of the abrasive grains of the abrasive segments. If the thickness of each axial-runout restraining member is larger than the thickness of each abrasive segment, the axial-runout restraining member could not enter the formed slot of the work material. If the thickness of each axial-runout restraining member is smaller than the thickness of each abrasive segment by an amount that is not smaller than the average size of the abrasive grains of the abrasive segments, the cutting saw would suffer from an axial runout by an amount larger than the average size of the abrasive grains, as measured at each abrasive segment which is fixed to the outer circumferential surface of the base disk.

The amount of the axial runout of the cutting saw as measured at each abrasive segment is increased with increase of the diameter of the cutting saw. However, the rotary cutting saw defined in the seventh aspect of the invention, in which the axial-runout restraining members are received in the radially outside and inside apertures, can be advantageously made large in size. Since the axial-runout of the cutting saw is restrained by the axial-runout restraining members received in the radially outside apertures and those received in the radially inside apertures, namely, since the axial-runout of the cutting saw is restrained in steps, it is possible to reduce a load exerted to each one of the restraining members.

Each of the axial-runout restraining members tends to be worn more at its radially outer portion than at the other portion, since the restraining member tends to be brought into contact more easily at its radially outer portion than the other portion, with the side surfaces of the slot formed in the work material. In the rotary cutting saw defined in the eighth aspect of the invention, in which the width of each axial-runout restraining member is reduced as viewed in the direction away from the outer periphery of the base disk toward the axis of the base disk, namely, is increased in a direction away from the axis to the outer periphery, such a local wear of each axial-runout restraining member at its radially outer portion can be restrained.

In the rotary cutting saw defined in each of the ninth and tenth aspects of the invention, each axial-runout restraining members is welded or otherwise fixed at its front side surface to the inner circumferential surface of the corresponding aperture, so that the clearance defined between the periphery of each aperture and the corresponding axial-runout restraining member is located on a rear side of the restraining member as viewed in the rotating direction. This arrangement is effective to prevent the clearance from being clogged with chips and accordingly avoid reduction in the heat dissipation performance.

BRIEF DESCRIPTION OF THE DRAWINGS

The above and other objects, features, advantages and technical and industrial significance of this invention will be better understood by reading the following detailed description of the presently preferred embodiments of the invention, when considered in connection with the accompanying drawings, in which.

DETAILED DESCRIPTION OF THE PREFERRED EMBODIMENTS

Figure 1A:
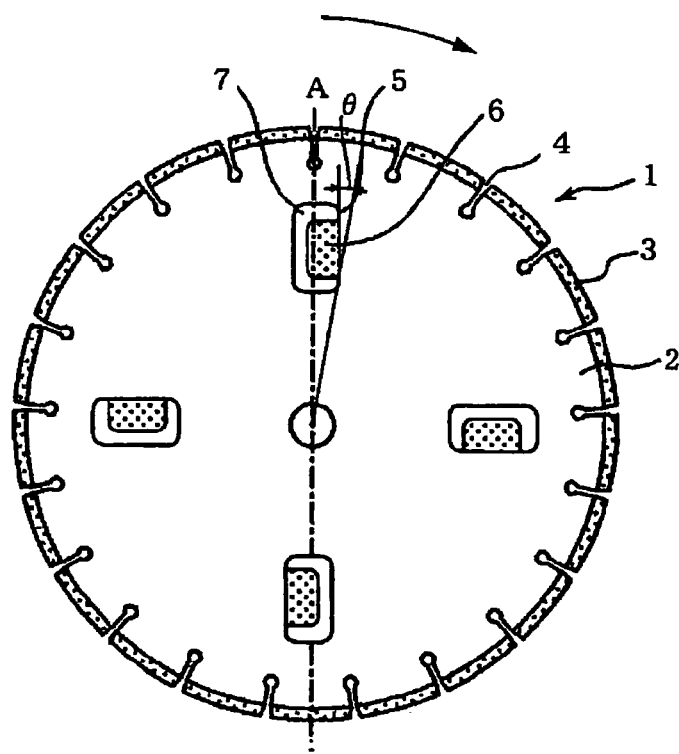
FIG. 1A is a front view of a rotary cutting saw constructed according to a first embodiment of the invention.
Figure 1B:
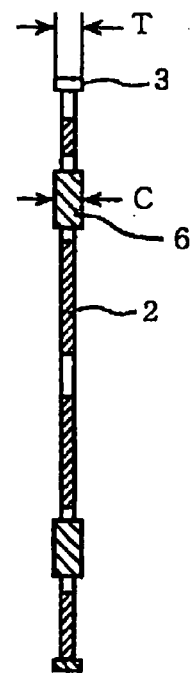
FIG. 1B is a cross sectional view taken along line A—A of FIG. 1A.

Referring first to FIGS. 1A and 1B, there will be described a rotary cutting saw 1 constructed according to a first embodiment of the invention. This rotary cutting saw 1 includes a circle-shaped base disk 2, a plurality of cutting chips 3 as abrasive segments, and a plurality of hard chips 6 as axial-runout restraining members or side-wall runout restraining members. The cutting chips 3 are fixed to an outer circumferential surface of the base disk 2 such that the cutting chips 3 are equally spaced apart from each other in a circumferential direction of the base disk 2. The base disk 2 has a plurality of chip-evacuation slits 4 formed between the cutting chips 3, so as to extend inwardly in a radial direction of the base disk 2 from the outer circumferential surface and also in an axial direction oft the base disk 2 over an entire thickness or axial length of the base disk 2. The base disk 2 has also a plurality of apertures 5 formed therethrough and opening in axially opposite end surfaces thereof. In each aperture 5 which is positioned in a radially intermediate portion of the base disk 2, there is fixedly received a corresponding one of the hard chips 6. Each aperture 5 is provided by an elongated hole which is elongated in a radial direction of the base disk 2 rather than in the circumferential direction of the base disk 2. Each aperture 5 has a predetermined amount of width as measured in the circumferential direction of the base disk 2, which width is constant as viewed in the radial direction of the base disk 2. Namely, the width of each aperture 5 at its radially outer end is substantially equal to the width of each aperture 5 at its radially inner end. Each aperture 5 has a size larger than that of each hard chip 6 received in each aperture 5, so that a clearance 7 is formed between a periphery of each aperture 5 and the corresponding hard chip 6.

In the present embodiment, each of the hard chips 6 is brazed or welded at its front side surface (as viewed in a rotating direction of the rotary cutting saw 1 as indicated by arrow of FIG. 1), to a front portion of an inner circumferential surface of a corresponding one of the apertures 5 (as viewed in the rotating direction). Since the hard chip 6 is thus fixed to the front portion of the inner circumferential surface of the aperture 5, the clearance 7 defined by and between the periphery of the aperture 5 and the hard chip 6 is located on a rear side of the hard chip 6 as viewed in the rotating direction. This arrangement is effective to prevent the clearance 7 from being dogged with chips (which are produced as a result of cutting of a work material by the cutting saw 1) and accordingly avoid reduction in a heat dissipation performance of the cutting saw 1. The brazing or welding of the hard chip 6 to the inner circumferential surface of the aperture 5 may be made by laser welding or electronic beam welding. It is noted that the front portion of the inner circumferential surface of the aperture 5, ie., the front side surface of the hard chip 6 is inclined by a predetermined angle θ, with respect to a straight line with passes through an axis of the base disk 2 and an radially inner end of the front side surface of the hard chip 6, such that the radially inner end of the front side surface of the hard chip 6 is positioned on a forward side of a radially outer end of the front side surface of the hard chip 6 as viewed in the rotating direction. The thus inclined front side surface of the hard chip 6 facilitates an air flow in a direction away from the axis of the base disk 2 toward an outer periphery of the base disk 2, namely, contributes to an increase in the heat dissipation capacity.

The plurality of apertures 5 are positioned relative to each other, so as to be equally spaced apart from each other as viewed in the circumferential direction, so that the plurality of hard chips 6 are equally spaced apart from each other in the circumferential direction Further, the hard chips 6 are positioned relative to each other such that the radially outer ends of the respective hard chips 6 are equally distant from the outer periphery (radially outer end) of the base disk 2. The radially outer ends of the respective hard chips 6 are radially distant from the outer periphery of the base disk 2 by the same distance of 5–20 cm.

Each of the cutting chips 3 is provided by an abrasive structure including diamond abrasive grains. Each of the hard chips 6 is provided by an abrasive structure including diamond abrasive grains, or alternatively, provided by a body formed of cemented carbide or a body including Co or Fe with content of Co or Fe being at least 50%. Where each hard chip 6 is provided by the body formed of cemented carbide or the body including Co or Fe, the hard chip 6 can be manufactured at low cost and can be given a high degree wear resistance and a high degree of weldability suitable for a laser welding.

Each hard chip 6 and the clearance 7 (defined between the periphery of each aperture 5 and the corresponding hard chip 6) have respective amounts of area, as seen in a front view of the cutting saw 1, i.e., as measured along a radial plane which is perpendicular to the axis of the base disk 2. A ratio of the amount of area of the clearance 7 with respect to the amount of area of the hard chip 6 is 5–150%. As to axial dimensions of the cutting saw 1, a thickness C of each hard chip 6 is slightly smaller than a thickness T of each cutting chip 3 by a predetermined amount that is smaller than an average size of the abrasive grains included in the abrasive structure providing each cutting chip 3. It is noted that the average size of the abrasive grains may be obtained on the basis of a grain size distribution which is commonly measured in accordance with a known method.

Figure 2:
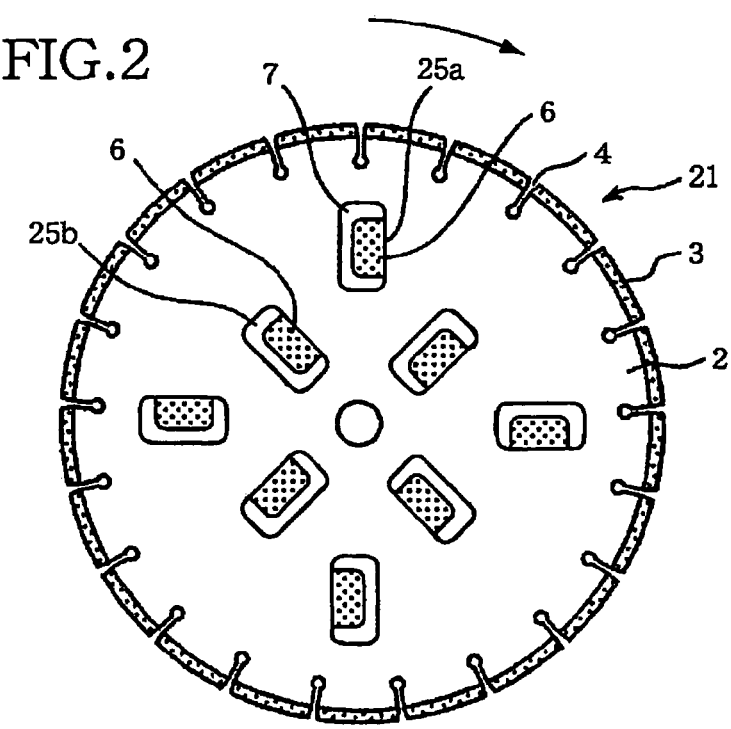
FIG. 2 is a front view of a rotary cutting saw constructed according to a second embodiment of the invention.

FIG. 2 shows another rotary cutting saw 21, which is constructed according to a second embodiment of the invention. Like the above-described rotary cutting saw 1 of FIGS. 1A and 1B, this rotary cutting saw 21 has the base disk 2, the plurality of cutting chips 3 attached to the outer circumferential surface of the base disk 2, and the chip-evacuation slits 4 formed between the cutting chips 3. However, this cutting saw 21 is different from the above-described cutting saw 1 in that its base disk 2 has a plurality of radially outside and inside apertures 25a, 25b formed therethrough such that the radially inside apertures 25b are located radially inwardly of the radially outside apertures 25a. It is preferable that the radially outside apertures 25a are equally spaced apart from each other in the circumferential direction of the base disk 2, and that the radially inside apertures 25b are equally spaced apart from each other in the circumferential direction, too. Like each of the apertures 5 of the cutting saw 1 of FIGS. 1A and 1B, each of the apertures 25a, 25b is provided by an elongated hole which is elongated in the radial direction of the base disk 2, and has a width that is constant as viewed in the radial direction of the base disk 2. Each of the apertures 25a, 25b has a size larger than that of each hard chip 6 received in each aperture 25a, 25b, so that the clearance 7 is formed between a periphery of each aperture 25a, 25b and the corresponding hard chip 6 which is welded to the inner circumferential surface of the aperture 25a, 25b. Owing to the arrangement in which the hard chips 6 received in the radially outside and inside apertures 25a, 25b, the rotary cutting saw 21 can be can be advantageously made large in size, to have an outside diameter of 700 mm or more.

Figure 3:
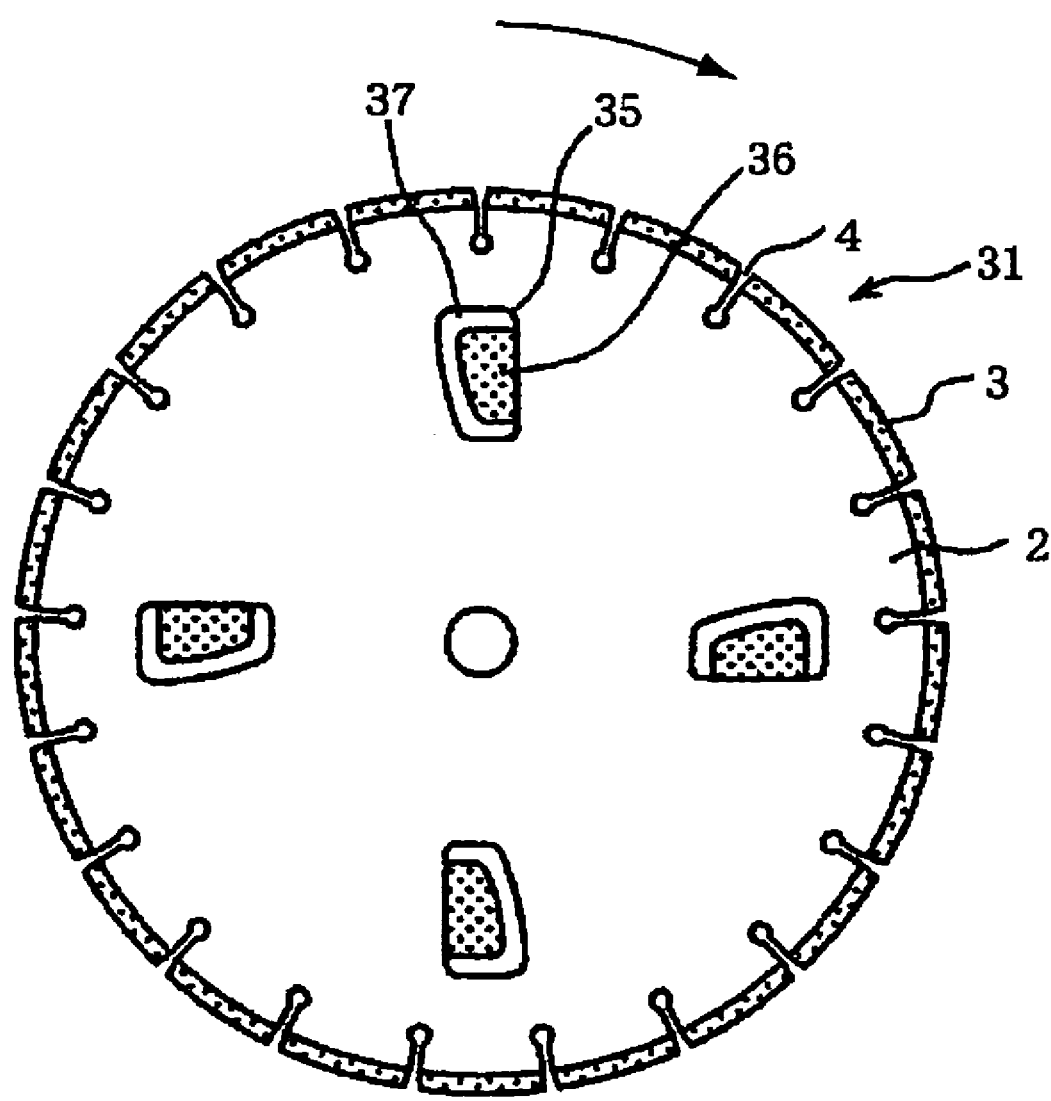
FIG. 3 is a front view of a rotary cutting saw constructed according to a third embodiment of the invention.

FIG. 3 shows still another rotary cutting saw 31, which is constructed according to a third embodiment of the invention. Like the above-described rotary cutting saw 1 of FIGS. 1A and 1B, this rotary cutting saw 31 has the base disk 2, the plurality of cutting chips 3 attached to the outer circumferential surface of the base disk 2, and the chip-evacuation slits 4 formed between the cutting chips 3. However, this cutting saw 31 is different from the above-described cutting saw 1 in that its base disk 2 has, in place of the above-described apertures 5, a plurality of apertures 35 has a width which is gradually changed as viewed in the radial direction of the base disk 2. Specifically described, each of the apertures 35 is provided by an elongated hole which is elongated in the radial direction of the base disk 2, and has a width (as measured in the circumferential direction of the base disk 2) which is reduced as viewed in a direction away from the outer periphery of the base disk 2 toward the axis of the base disk 2. In other words, each aperture 35 has a relatively large width at its radially outer end, and has a relatively small width at its radially inner end. Each of hard chips 36 as axial-runout restraining members, which is received in the corresponding aperture 35 so as to cooperate with the periphery of the aperture 35 to define a clearance 37 therebetween, has a width reduced as viewed in the direction away from the outer periphery of the base disk 2 toward the axis of the base disk 2, too. It is noted that the apertures 35 are positioned relative to each other so as to be equally spaced apart from each other as viewed in the circumferential direction of the base disk 2, like the above-described apertures 5.

Figure 4:
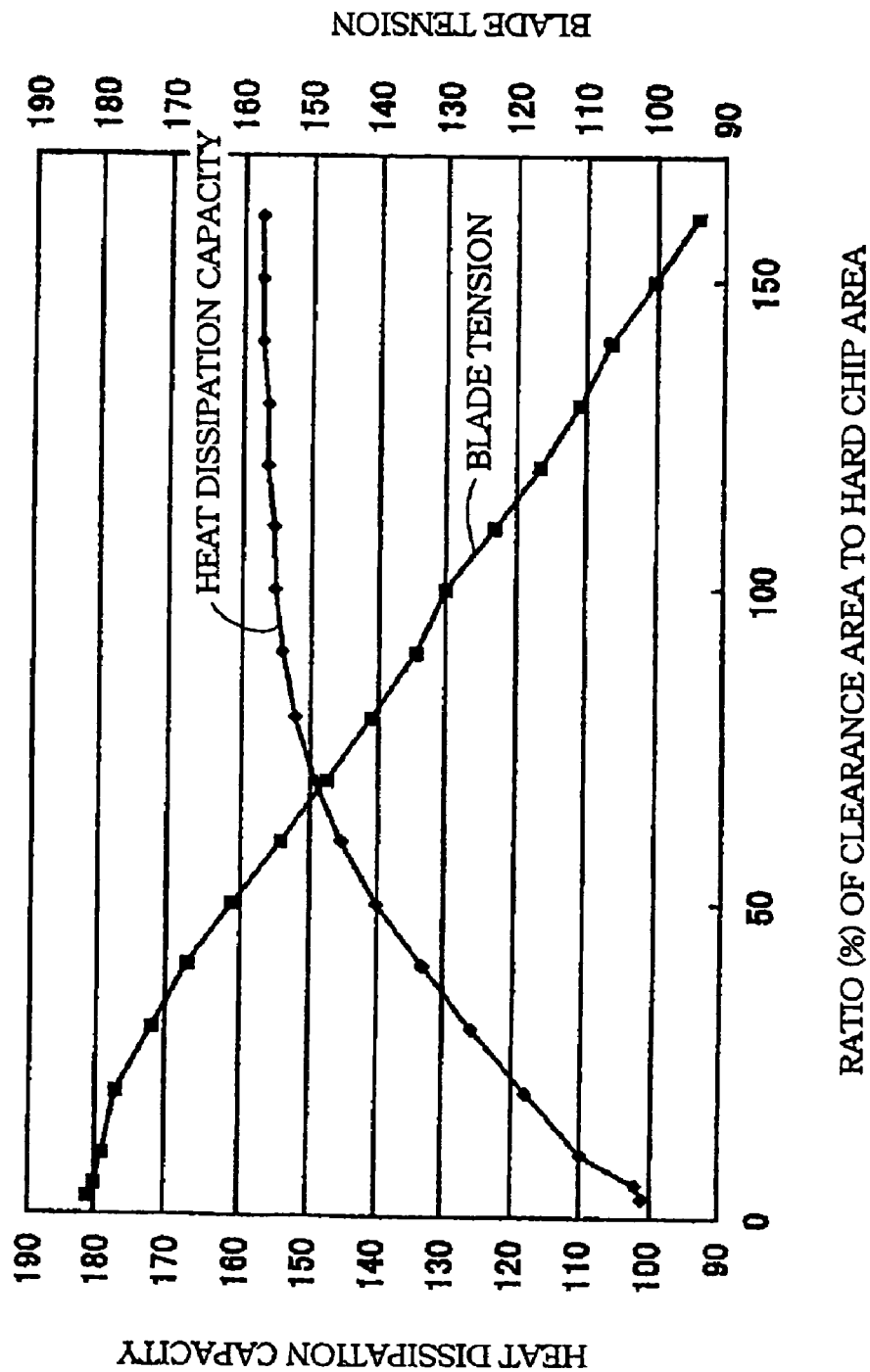
FIG. 4 is a graph showing changes in heat dissipation capacity and blade tension of a rotary cutting saw, in relation with change in size of a clearance which is defined between a periphery of each of apertures (formed through a base disk of the cutting saw) and a corresponding one of axial-runout restraining members (received in the respective apertures).

FIG. 4 is a graph representative of a relationship between the heat dissipation capacity of the cutting saw and the size of the clearance defined between the periphery of each aperture (formed through the base disk of the cutting saw) and the corresponding hard chip (received in the aperture), and a relationship between the blade tension of the cutting saw and the size of the clearance. In the graph, its horizontal axis represents the above-described ratio (%) of the area of the clearance to the area of the hard chip, while its vertical axis represents the heat dissipation capacity and the blade tension. The graph indicates degrees of the heat dissipation capacity and blade tension at various levels of the ratio, with each of those being set at 100 as a reference value where the cutting saw is not provided with the apertures and the hard chips (axial runout restraining members). As is apparent from the graph, the degree of heat dissipation capacity tends to be increased with increase in the area of the clearance, while the degree of blade tension tends to be reduced with increase in the area of the clearance. When the ratio is 5%, the degree of heat dissipation capacity is about 100 corresponding to its required minimum degree. When the ratio is 150%, the degree of blade tension is about 100 corresponding to its required minimum degree. Therefore, with the ratio being held in a range between 5% and 150%, the cutting saw can be given a required degree of heat dissipation capacity and a required degree of blade tension. Further, it can be gathered from the graph that a high degree of heat dissipation capacity and a high degree of blade tension are both given to the cutting saw where the ratio is about 50–100%.

As is clear from the foregoing description, the rotary cutting saw constructed according to the principle of the present invention has a heat dissipation capacity which is improved owing to the clearances each formed around a corresponding one of the hard chips which are attached to the base disk. The improvement in the heat dissipation capacity makes it possible to prevent burning of the cutting chips. Further, owing to the provision of the hard chips serving as the axial-runout restraining members, an axial runout of the rotary cutting saw, i.e., an axial motion of each cutting chip can be restrained in a cutting operation, thereby making it possible to reduce wear of side surfaces of each cutting chip and prevent the base disk from being contact at its axially opposite end surfaces with a work material Therefore, the rotary cutting saw is capable of maintaining its excellent cutting performance over a large period of time, even where the cutting saw is used in a dry-cutting operation in which a work material such as a pavement is cut or parted without application of a cutting fluid to the cutting chips of the cutting saw.

While the presently preferred embodiments of the present invention have been illustrated above, it is to be understood that the invention is not limited to the details of the illustrated embodiments, but may be embodied with various other changes, modifications and improvements, which may occur to those skilled in the art, without departing from the spirit and scope of the invention defined in the following claims.

What is claimed is:

1. A rotary cutting saw comprising:
    a base disk which has a plurality of apertures formed therethrough and opening in axially opposite end surfaces thereof;
    a plurality of abrasive segments which are fixed to an outer circumferential surface of said base disk; and
    a plurality of axial-runout restraining members which are received in said apertures,
    wherein each of said axial-runout restraining members has a size which is smaller than a size of each of said apertures, such that a clearance is defined between a periphery of each of said apertures and a corresponding one of said axial-runout restraining members which is received in said each of said apertures, and wherein a ratio of a size of said clearance to said size of each of said axial-runout restraining members ranges between 1:20 and 3:2.

2. The rotary cutting saw according to claim 1, wherein said ratio ranges between 1:2 and 1:1.

3. The rotary cutting saw according to claim 1, wherein each of said axial-runout restraining members received in a corresponding one of said apertures has a predetermined amount of area as measured along a radial plane which is perpendicular to an axis of said base disk, wherein said clearance defined between said periphery of each of said apertures and a corresponding one of said axial-runout restraining members has a predetermined amount of area as measured along said radial plane, and wherein said ratio represents a ratio of said amount of area of said clearance to said amount of area of each of said axial-runout restraining members.

4. The rotary cutting saw according to claim 1, wherein each of said abrasive segments is provided as a chip which has an abrasive structure including diamond abrasive grains, and wherein each of said axial-runout restraining members is provided as a chip which has an abrasive structure including diamond abrasive grains.

5. The rotary cutting saw according to claim 1, wherein each of said abrasive segments is provided as a chip which has an abrasive structure including diamond abrasive grains, and wherein each of said axial-runout restraining members is provided as a chip which is formed of cemented carbide.

6. The rotary cutting saw according to claim 1, wherein each of said abrasive segments is provided as an abrasive structure including abrasive grains, wherein each of said abrasive segments fixed to said outer circumferential surface of said base disk has a predetermined thickness as measured in an axial direction of said base disk, wherein each of said axial-runout restraining members received in a corresponding one of said apertures has a predetermined thickness as measured in said axial direction, and wherein said thickness of each of said axial-runout restraining members is smaller than said thickness of each of said abrasive segments by a predetermined amount that is smaller than an average size of said abrasive grains included in said abrasive structure of each of said abrasive segments.

7. The rotary cutting saw according to claim 1, wherein said base disk has radially outside and inside apertures as said plurality of apertures such that said radially inside apertures are located radially inwardly of said radially outside apertures, wherein said radially outside apertures are equally spaced apart from each other as viewed in a circumferential direction of said base disk, while said radially inside apertures are equally spaced apart from each other as viewed in said circumferential direction, wherein said axial-runout restraining members received in said radially outside apertures have respective radially outer ends which are equally distant from an outer periphery of said base disk, and wherein said axial-runout restraining members received in said radially inside apertures have respective radially outer ends which are equally distant from said outer periphery of said base disk.

8. The rotary cutting saw according to claim 1, wherein each of said apertures has a width as measured in a circumferential direction of said base disk, which width is reduced as viewed in a direction away from an outer periphery of said base disk toward an axis of said base disk, and wherein each of said axial-runout restraining members received in a corresponding one of said apertures has a width as measured in said circumferential direction, which width is reduced as viewed in said direction away from said outer periphery of said base disk toward said axis of said base disk.

9. The rotary cutting saw according to claim 1, wherein each of said axial-runout restraining members received in a corresponding one of said apertures is fixed at a front side surface of each of said axial-runout restraining members as viewed in a rotating direction of said rotary cutting saw to an inner circumferential surface of the corresponding one of said apertures.

10. The rotary cutting saw according to claim 9, wherein said front side surface of each of said axial-runout restraining members is inclined by a predetermined angle, with respect to a straight line which passes through an axis of said base disk and a radially inner end of said front side surface of each of said axial-runout restraining members, such that said radially inner end of said front side surface is positioned on a forward side of a radially outer end of said front side surface as viewed in said rotating direction.

* * * * *